United States Patent [19]

Ringelhaan

[11] Patent Number: 5,155,744
[45] Date of Patent: Oct. 13, 1992

[54] COMBINER FOR RADIO RECEIVING SYSTEM WHICH USES A VITERBI DEMODULATOR

[75] Inventor: Otmar Ringelhaan, Greifenberg, Fed. Rep. of Germany

[73] Assignee: Siemens Aktiengesellschaft, Munich, Fed. Rep. of Germany

[21] Appl. No.: 468,844

[22] Filed: Jan. 22, 1990

[30] Foreign Application Priority Data

Feb. 1, 1989 [EP] European Pat. Off. ........ 89101724.6

[51] Int. Cl.⁵ .......................... H04B 1/10; H04B 7/02; H04L 1/02
[52] U.S. Cl. ...................................... 375/94; 375/100; 375/102; 455/133; 455/137; 455/337
[58] Field of Search .............. 455/133, 137, 138, 337, 455/303; 375/94, 96, 100, 102; 371/43

[56] References Cited

U.S. PATENT DOCUMENTS 3,815,028  6/1974  Rabow ................................. 375/83
4,281,411  7/1981  Bonn et al. ........................... 375/14
4,991,184  2/1991  Hashimoto ............................ 375/8

OTHER PUBLICATIONS

Error Rate Performance Comparison of MLSE and Decision Feedback Equalizer on Rayleigh Fading Multipath Channels, Giordano et al., IEEE International Conference on Communications, San Francisco, US, Jun. 16-18, 1975, vol. 1, IEE.

Frequency-Uncertain Fading Channel Reception of Diversity FSK Transmissions, 1980 IEEE, Richard R. Kurth.

Primary Examiner—Reinhard J. Eisenzopf
Assistant Examiner—Chi H. Pham
Attorney, Agent, or Firm—Hill, Van Santen, Steadman & Simpson

[57] ABSTRACT

A combiner for a radio receiving signal which receives signals having various signal paths of a digital radio transmitter, particularly a mobile transmitter. The combiner is designed so it allows maximum power gain in broadband systems and can also be used in systems which have pulse or discontinuous transmission. A correlator is provided at the receiver in every signal path. Frequency converters are also in each signal path. Following the frequency converter and following each of the correlators there is provided a metric table in each path which had been calculated in accordance with the respective line model obtained at the receiver. The output values formed from the metric tables and individual signals are combined and supplied to a Viterbi demodulator which produces the corrected output signal.

1 Claim, 1 Drawing Sheet

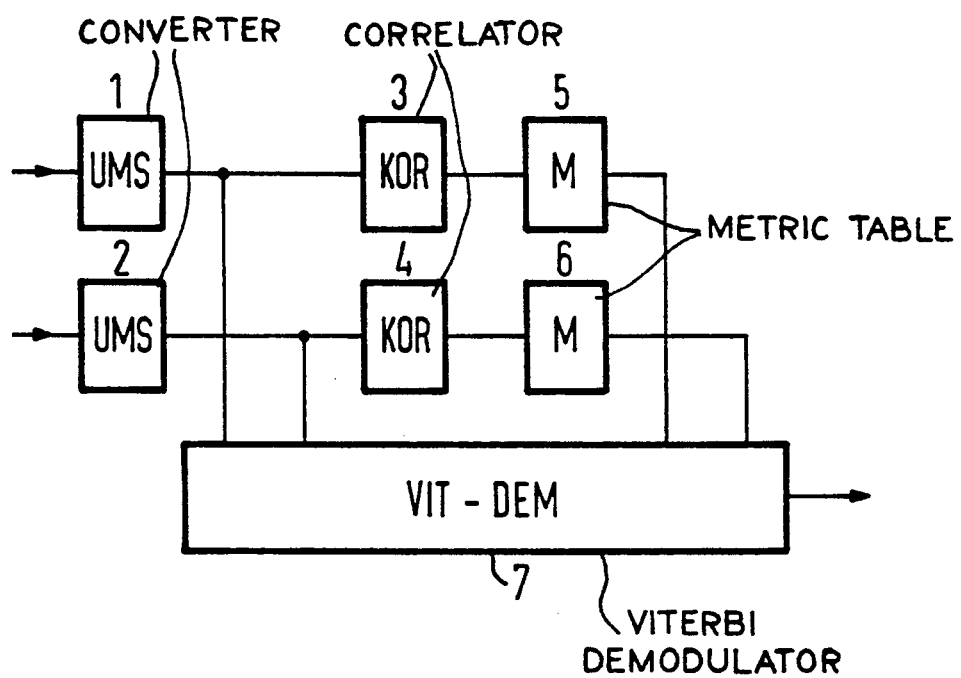

COMBINER FOR RADIO RECEIVING SYSTEM WHICH USES A VITERBI DEMODULATOR

BACKGROUND OF THE INVENTION

1. Field of the Invention

This invention relates to a combiner for a radio receiver which receives signals travelling by different signal paths of a digital transmitter such as a mobile transmitter in which the individual received signals are demodulated after standard frequency conversion.

2. Description of the Related Art

In radio transmission, particularly mobile broadcasting, transmission can be disturbed by multi-path reception. Such multi-path reception generally causes a frequency dependency of the transmission factor which appears as selective fading.

In narrow-band systems, which are systems having a relatively low transmission band width, the transmission factor of a given link is nearly constant within the transmission band width. Changing propagation conditions merely causes level fluctuations of the received signal, and for this reason, signals from different antennas can be superimposed to obtain additional gain without problems. Such superimposition or addition usually is performed in the IF stage whereby a control of the phases of the individual demodulated carriers relative to each other assures that the individual IF signals are coincidence with each other. Terms used for such system are "equal gain" or "maximal ratio combining", which refers to a potential evaluation of the individual signals.

Such a quasi, linear diversity combiner is also generally used in broadband systems. However, in such systems, respective transmission factor is not constant within the transmission band and for this reason, changing propagation conditions also cause variations in the signal distortions which are present. When signals which are differently distorted are superimposed, the individual signals can only be brought into incomplete coincidence despite control of the phases of the demodulation carriers and for this reason, the maximum possible diversity power gain cannot be obtained.

In the method of quasi linear superimposition, a certain coincidence of the signals which are to be superimposed must be produced. The criteria required is usually derived from a comparison of the incoming signals in a continuous manner and this does not represent a problem which cannot be solved when continuous transmission occurs. If discontinuous transmission occurs, as, for example, in the future, Pan-uropean mobile radio network, such a superimposition and combining is not possible without additional considerations. In such a case, successive pulse groups or bursts may have completely different distortion and for this reason, every pulse group or burst must be individually processed. Thus, a criteria for the control procedure in a pulse system is not available.

"Mobile Communications Engineering" by W. C. Y. Lee, 1982, McGraw Hill, pages 291 ff, discloses such prior art "diversity combiners".

SUMMARY OF THE INVENTION

It is an object of the present invention to provide a diversity combiner for a radio transmitting system that allows the maximum gain in broadband systems and can also be used in systems which have discontinuous or pulse transmission.

The object of the invention is achieved by using a correlator and a metric table which are inserted in every signal path in series with a frequency converter. The metric table calculates the receptive line model of the receiver as a transversal filter in that the possible output voltage values of the models of every receiving path are calculated and the voltage values which belong together are stored under the same address and during the course of the transmission, the squares of the distances from the deposited voltage values are calculated for the signal values and the squares of the various reception paths resulting under the same address are combined to obtain an aggregate value for further processing in a Viterbi demodulator.

Other objects, features and advantages of the invention will become apparent from the following description and claims when read in view of the drawing.

BRIEF DESCRIPTION OF THE DRAWING

The drawing is a block diagram illustrating the invention.

DESCRIPTION OF THE PREFERRED EMBODIMENT

In the present invention a novel feature comprises a combiner in a receiver which has a Viterbi demodulator. Such a receiver is preferably suited for demodulation of signals which have been distorted by multi-path reception. As contrasted to receivers where an attempt is made to eliminate the signal distortion using a quadripole inverse relative to the line, the most probable transmission sequence is calculated from the distorted received signal on the basis of the knowledge of the pulse response of the line. For this purpose, the line is modeled in the receiver as a transversal filter which has five taps and all those voltage values which this filter can output are calculated for binary transmission and a line which has been modeled as a filter having five taps. These, for example, would be 32 different voltage values. These voltage values form the basis of the calculation of the most probable sequence that was transmitted. The square of these amplitudes for all of those voltage values is then calculated for every received value and then the probable sequence having the lowest square sum can be identified. The article by G. D. Forney, The Viterbi Algorithm in the Proceedings of the IEEE, Vol. 61, No. 3, pages 268 ff, describes the Viterbi algorithm. This article is hereby incorporated by reference. See also the article entitled: "Error Rate Performance Comparison of MLSE and DECISION Feedback Equalizer on Rayleigh Fading Multipath Channels", by A. A. Giordano, J. H. Lindholm, T. A. Schonhoff and J. G. Proakis, presented at the Institute of Electrical and Electronic Engineers, International Conference on Communication, San Francisco, Jun. 16-18, 1975, pages 5-1 through 5-5.

The calculation of the line model required is performed by correlation of the received signal. In signals which are continuously transmitted, the signal is continuously correlated with delayed images of itself. In discontinuous transmission in which pulse groups or bursts, contain a sequence such as a sync word, or preamble known to the receiver the line model is obtained by means of an appropriately programmed correlator.

The invention comprises processing the various received signals in common in a Viterbi demodulator after conversion has been accomplished. This is executed in a digital transmission system having Viterbi demodulation for the purposes of diversity reception. For this purpose, each receiver must have its own correlator for the calculation of the receiving line model. The possible output voltage values are calculated for the transversal filter models for each reception path and the voltage values which belong together are stored under the same address in a storage means. During the course of the transmission, the squares of the distances between the redeposited voltage values and the signal values occurring at the various receivers are calculated and the squares obtained from various reception paths which occurred under the same address are combined into an aggregate value for further Viterbi processing. This procedure corresponds to a coherent addition of the various received signals which means that the maximum possible diversity energy gain can be achieved in this manner.

The FIG. shows a combiner for two received signals, although it should be realized that more than two signals can be utilized and the use of two is merely for illustrative purposes. It is required that the same message be transmitted in the various channels. The various channels can be realized in at least two different ways such as with antenna diversity, sometimes called space diversity, and with frequency diversity.

The received signals of the two signal paths are respectively first supplied to a converter 1 in the first; signal path and a converter 2 in the second signal path where they are converted into the base band or into a suitable intermediate frequency. A first correlator 3 which calculates the pulse response of the particular channel is connected in series with converter 1 and a second correlator 4 is connected in series with converter 2. In the correlators 3 and 4, the possible instantaneous values of the received input signals are calculated from the pulse response of the channel and are then respectively supplied to metric tables 5 and 6. The procedure of correlation and metric calculation can be carried out once before the transmission or can also be continuously carried out for ongoing correction. The outputs of the converters 1 and 2 and the metric tables 5 and 6 are supplied to a Viterbi demodulator 7 which calculates from the input signals, the corrected output signal which is the transmitted intelligence and supplies it to a suitable output means, not shown.

Although the invention has been described with respect to preferred embodiments, it is not to be so limited as changes and modifications can be made which are within the full intended scope of the invention as defined by the appended claims.

I claim as my invention:

1. A digital radio receiver for receiving at least two received signals from different paths from a digital radio transmitter, such as a mobile radio transmitter, whereby the individual received signals are demodulated after a standard frequency conversion, comprising two frequency converters with each mounted so as to each receive one of said received signals, two correlators with each mounted in series with one of said two frequency converters and said two correlators connected in series with each received signal, two metric tables with each mounted in series with each of said correlators for storing the possible output voltage values of the receptive line model of its reception path, each of said metric tables calculating the received voltage values of its received signal, the squares of the differences between said received voltage values and the corresponding stored possible output voltage values, and further combining said squares, a Viterbi demodulator supplied with said combined results from the various reception paths and with said received signals from the outputs of said frequency converters for further processing to obtain an accurate received signal.

* * * * *